(12) United States Patent
Cheatle (10) Patent No.: US 7,305,146 B2
(45) Date of Patent: Dec. 4, 2007

(54) TILT CORRECTION OF ELECTRONIC IMAGES

(75) Inventor: Stephen Philip Cheatle, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 822 days.

(21) Appl. No.: 10/343,156

(22) PCT Filed: May 20, 2002

(86) PCT No.: PCT/GB02/02327

§ 371 (c)(1),
(2), (4) Date: Jan. 29, 2003

(87) PCT Pub. No.: WO03/005702

PCT Pub. Date: Jan. 16, 2003

(65) Prior Publication Data

US 2003/0152291 A1   Aug. 14, 2003

(30) Foreign Application Priority Data

Jun. 30, 2001   (GB) ................................. 0116113.2

(51) Int. Cl.
*G06K 9/32* (2006.01)
*G06K 9/00* (2006.01)

(52) U.S. Cl. ..................................... 382/296

(58) Field of Classification Search ................ 382/118, 382/162, 254, 276, 278, 282, 289, 291, 293, 382/190, 195, 275, 296; 358/429, 474, 486–488, 358/490, 496, 497
See application file for complete search history.

(56) References Cited

U.S. PATENT DOCUMENTS

| | | | |
|---|---|---|---|
| 3,956,758 A | 5/1976 | Numata et al. | |
| 4,317,620 A | 3/1982 | Coppa et al. | |
| 4,384,336 A | 5/1983 | Frankle et al. | |
| 4,423,936 A | 1/1984 | Johnson | |
| 4,541,704 A | 9/1985 | Freeman | |
| 4,605,970 A | 8/1986 | Hawkins | |
| 4,724,330 A | 2/1988 | Tuhro | |
| 5,091,654 A | 2/1992 | Coy et al. | |
| 5,227,889 A | 7/1993 | Yoneyama et al. | |
| 5,345,284 A | 9/1994 | Tsuruta | |
| 5,384,615 A | 1/1995 | Hsieh et al. | |
| 5,486,893 A | 1/1996 | Takagi | |
| 5,500,711 A | 3/1996 | Sasagaki et al. | |
| 5,511,148 A | 4/1996 | Wellner | |
| 5,517,242 A | 5/1996 | Yamada et al. | |
| 5,666,186 A | 9/1997 | Meyerhoefer et al. | |
| 5,838,836 A * | 11/1998 | Omvik | 382/276 |
| 5,900,909 A | 5/1999 | Parulski et al. | |
| 5,901,253 A * | 5/1999 | Tretter | 382/289 |

(Continued)

FOREIGN PATENT DOCUMENTS

EP   0 595 299 A2   5/1994

(Continued)

OTHER PUBLICATIONS

K. Hachimura et al., "Image Retrieval Based on Compositional Features and Interactive Query Specification", *IEEE*, Sep. 3, 2000, pp. 262-266.

(Continued)

*Primary Examiner*—Amir Alavi (57) ABSTRACT

A method of correcting the tilt, or rotation, of a casually captured image is described. Having corrected the rotation of the original image, the image is cropped by determining a crop boundary by applying one or more rules of composition to the image. The resulting image is more satisfactorily composed compared with prior art methods.

24 Claims, 8 Drawing Sheets

U.S. PATENT DOCUMENTS

| | | | |
|---|---|---|---|
| 5,973,734 A * | 10/1999 | Anderson | 348/239 |
| 5,978,519 A | 11/1999 | Bollman et al. | |
| 6,067,112 A | 5/2000 | Wellner et al. | |
| 6,289,110 B1 | 9/2001 | Kim et al. | |
| 6,430,320 B1 * | 8/2002 | Jia et al. | 382/289 |
| 6,556,721 B1 | 4/2003 | Wang et al. | |
| 6,671,405 B1 | 12/2003 | Savakis et al. | |
| 6,686,970 B1 | 2/2004 | Windle | |
| 6,728,407 B1 | 4/2004 | Horiuchi et al. | |
| 6,813,395 B1 | 11/2004 | Kinjo | |
| 6,934,052 B2 * | 8/2005 | Venable | 358/1.18 |
| 2001/0014183 A1 * | 8/2001 | Sansom-Wai et al. | 382/289 |
| 2002/0114535 A1 | 8/2002 | Luo | |
| 2002/0152291 A1 | 10/2002 | Fernandez et al. | |
| 2002/0191860 A1 | 12/2002 | Cheatle | |
| 2002/0191861 A1 | 12/2002 | Cheatle | |
| 2003/0152291 A1 * | 8/2003 | Cheatle | 382/296 |
| 2004/0052430 A1 * | 3/2004 | Albertelli et al. | 382/289 |
| 2004/0080670 A1 | 4/2004 | Cheatle | |
| 2006/0203107 A1 * | 9/2006 | Steinberg et al. | 348/239 |
| 2006/0204057 A1 * | 9/2006 | Steinberg | 382/118 |

FOREIGN PATENT DOCUMENTS

| | | |
|---|---|---|
| EP | 0 912 047 A2 | 4/1999 |
| EP | 0 924 923 A2 | 6/1999 |
| JP | 2000-244800 | 9/2000 |
| JP | 2001-148843 | 5/2001 |
| WO | WO 95/32581 A1 | 11/1995 |
| WO | WO 99/03264 A1 | 1/1999 |
| WO | WO 99/09887 A1 | 3/1999 |
| WO | WO 00/38417 A1 | 6/2000 |
| WO | WO 03/012678 A2 | 2/2003 |

OTHER PUBLICATIONS

C. Ordonez et al., "Discovering Association Rules Based on Image Content", *IEEE*, May 19, 1999, pp. 38-49.

* cited by examiner

TILT CORRECTION OF ELECTRONIC IMAGES

BACKGROUND

The present invention relates to a method of correcting the tilt, or rotation, of an electronic image by cropping a rotated version of the original image in accordance with a predefined set of image composition rules. The present invention also relates to an image processing system employing this method and an image capture system incorporating such an image processing system.

When photographs are taken without due care by a photographer the camera may not be correctly orientated with respect to the horizontal. This results in a tilted, or rotated, image. The tilt can be corrected by rotating the electronic image by an angle equal to the angle to the horizontal that the camera was originally held at. However, the rotated image must typically be cropped to generate a final image rectangle with horizontal and vertical edges. A problem then arises of how best to select the position of this cropped image.

The above problem also applies to images recorded by a video camera, because moving images are being continuously recorded onto a recording medium, it is advantageous to correct the tilt of the camera before the moving images are stored.

Image handling systems have been proposed to address the problem of tilt.

EP 949802 discloses a scanner for scanning a document. The document may be presented in a document carrier, typically a transparent envelope, in order to protect it from damage by a feed mechanism incorporated within the scanner. The scanner automatically ignores components in the scanned image due to the document carrier or resulting from imaging parts of the scanner. The scanner seeks to identify the edges of the scanned document in order to determine the skew of the document with respect to the scanner. The de-skew process does not take account of the content of the document. Hence it cannot work if the image in a scanned photograph is skewed.

GB 2124055 relates to a photographic processing system. The system allows a user to set up a rough sketch pattern showing which portions of a plurality of input images are to be placed in an output image. The sketch needs to be determined prior to commencing a scan and write cycle as this information is used to control the position and speed of scan and write heads. Thus there is no automatic de-skewing of a picture.

GB 2350251 relates to a system for merging two or more images. One of the images is a pre-stored template having a hole therein for receiving a user generated image. The image is stored at two different resolutions, with the lower resolution image being used to display relative positioning of the two images, and the high resolution image being used to drive a printer. The system allows for the user generated image to be skewed automatically to match the general skew of a "frame" presented in the template. However the skewing is performed with respect to the edge of the user generated image. The skewing is not performed based on an analysis of the content of the image.

JP 6059430 discloses a "layout scanner" which seems to allow a user to define a trimming frame such that the user can instruct a design to be "cut out" and rotated.

Cameras containing tilt sensors to allow tilted images to be automatically corrected by electronic rotation are known. In some cases tilt sensors are applied to simply switch between recording of the image in a portrait orientation and recording the image in a landscape orientation. One example of such a system is that disclosed in U.S. Pat. No. 5,900,909. This patent discloses a method of detecting when a camera is held in a vertical "portrait" orientation and a system to automatically rotate the image such that the image is always recorded in the "landscape" horizontal position. This makes subsequent viewing of the images easier. A further example of this system is disclosed in the International application WO99/03264 that discloses a method of maintaining the aspect ratio of a captured image for both landscape and portrait images. Other, more advanced systems are also known, for example the video camera disclosed in U.S. Pat. No. 5,227,889 that employs a technique for correcting unintentional arbitrary tilt. However, a significant omission from the system disclosed in U.S. Pat. No. 5,227,889, and in other known systems, is the lack of any intelligent method for selecting where to position the crop rectangle in the rotated image. This disadvantage can most easily be understood by reference to FIGS. 1a-1d.

Figure 1A:
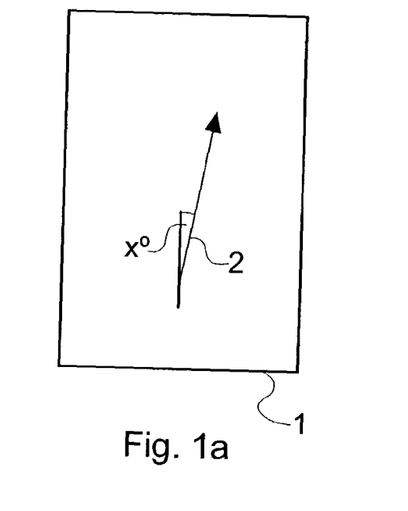
FIGS. 1a-1d schematically illustrate a method of correcting the tilt of a rotated image according to the prior art.
Figure 1B:
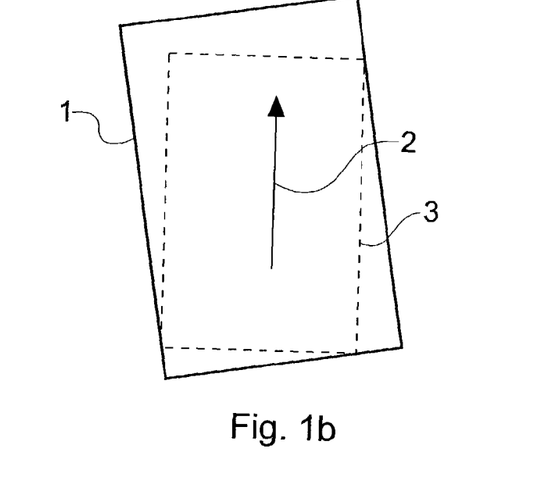
Figure 1C:
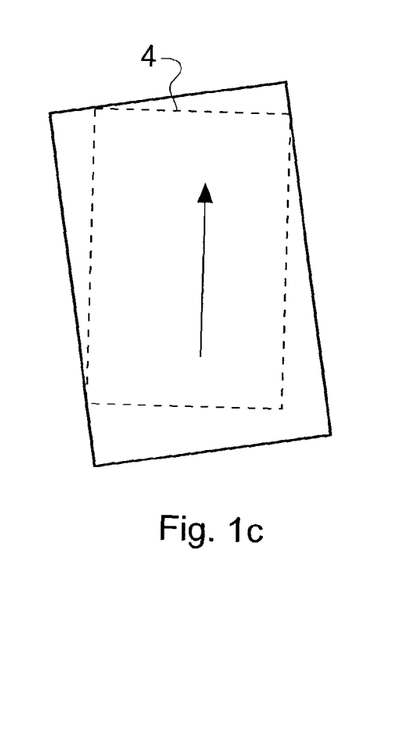
Figure 1D:
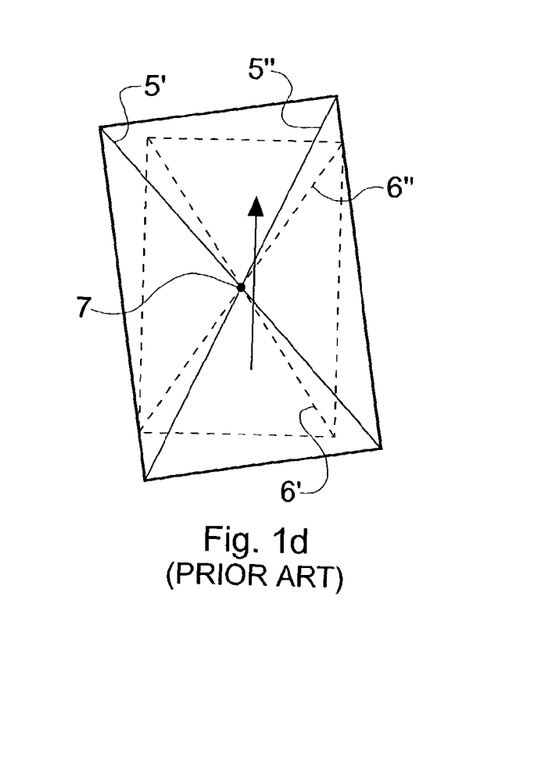

FIG. 1a schematically represents an image recorded by a camera at a skewed angle. The arrow 2 shown with the image 1 represents a true vertical line and it can therefore be seen that the image 1 has been skewed by X degrees. FIG. 1b then shows the image 1 rotated by X degrees such that the arrow 2 is now vertically orientated. The rectangle 3 (shown in chain line) illustrates one possible crop boundary that could be applied to the rotated image 1 to produce a rectangular image having the correct orientation. FIG. 1c illustrates an alternative crop boundary 4 that may be applied to the rotated image 1. Both the crop boundary 3 shown in FIG. 1b and the crop boundary 4 shown in FIG. 1c represent the largest possible rectangular crop boundary that will fit within the rotated image 1. A typical prior art solution, and that applied in U.S. Pat. No. 5,227,889, is to ensure that the centre of the crop boundary is coincident with the centre of the original image. This is illustrated in FIG. 1d, where the centre of the original image is represented by the point 7, defined by the intersection of the two opposite diagonals 5' and 5" of the original image, and shows the largest crop boundary that will fit within the original tilted image having its centre, as defined by diagonals 6' and 6", coincident with that of the original image.

This choice, or any other arbitrary choice, may not produce the best possible re-composition of the image as the choice takes no account of the subject matter of the image. It would therefore be advantageous to produce a method of correcting the tilt of an image by generating a crop boundary that does take into account the subject matter of the image.

SUMMARY OF THE INVENTION

According to a first aspect of the present invention there is provided a method of correcting the tilt of an electronic image, the method comprising: rotating an original, tilted image by a correction angle of rotation; and cropping the resulting rotated image in accordance with at least one rule selected from a predefined set of image composition rules such that the crop boundary is contained within the original image.

It is thus possible to provide a method which selects the crop boundary based on an analysis of the features within the image, rather than by merely centring the cropped image such that the centre of the cropped image is co-axial with the centre of the original image.

Preferably, the image composition rules comprise: identifying one or more elements of interest within the image;

selecting one or more of said identified elements to be included within the cropped image; and generating at least one crop boundary so as to include said selected elements of interest.

Advantageously the original tilted image has a predefined aspect ratio and the resulting rotated image is cropped such that the cropped image has the same predefined aspect ratio.

The aspect ratio may correspond to that of the device used to capture the image. However, other aspect ratios may be chosen, such as those of computer monitors, wide screen or normal screen televisions, common paper sizes for printers or photographs, or user defined ratios. However, a plurality of aspect ratios may be available for use, and an image processor implementing the present invention may be free to choose between them to select the best crop to fit the area of interest.

Preferably the crop boundary is not constrained to have substantially the same orientation as the original. Thus, for example an inexperienced user may have taken a tilted photograph in portrait format. However, after taking composition into account it may well be that the only compositionally interesting part of the image should in fact be bounded by a landscape boundary. Indeed, it is not necessarily the case that the crop boundaries must be rectangular. The user may select other shaped boundaries, for example from a predetermined list of shapes.

Preferably, the generated crop boundary is smaller than the largest crop boundary that can be fitted within original tilted image.

The correcting angle of rotation may be determined at the time of capturing the original image, for example with the use of a tilt sensor attached to the original camera apparatus.

Alternatively, the correcting angle of rotation may be manually input at the time of applying the correction. A further alternative for determining the angle of rotation is by analysis of the original image. Such analysis may include identifying one or more features of the original tilted image that have a known orientation and determining the angle of rotation of said identified features with respect to their known orientation. Thus, for example, the image analysis may seek to identify the edges of buildings, and if the edges are parallel may use these edges to define the vertical direction on the assumption that walls are generally vertical. The verticals may converge within the image, but this can be accounted for in the image analysis.

According to a second aspect of the present invention there is further provided an image processing system for correcting rotation of an electronic image, comprising: an image input arranged to receive an original rotated image; an angle of rotation input arranged to receive a signal indicative of an angle of rotation associated with said original image; and an image processor responsive to said image input and said angle of rotation input and arranged to rotate said original image by said angle of rotation and to crop the resulting rotating image in accordance with at least one rule selected from a predefined set of image composition rules such that the crop boundary is contained within the original image.

According to a third aspect of the present invention there is further provided an image capture system for electronically capturing an image, comprising: optical image focussing elements for focussing said image; an electronic image conversion array arranged to convert said optically focussed image into an electronic image; a rotation calculator for determining the angle of rotation of said image capture system and generating a signal indicative of said angle of rotation; and an image processing system for correcting tilt of an electronic image, comprising:
an image input arranged to receive an original rotated image;
an angle of rotation input arranged to receive a signal indicative of said angle of rotation associated with said original image; and
an image processor for receiving said electronic image and said angle of rotation and arranged to rotate said original image to correct for said angle of rotation and to crop the resulting rotated image in accordance with a predefined set of image composition rules.

According to a fourth aspect of the present invention there is provided an electronic camera, said camera further including a data processor responsive to a rotation sensor to provide a correction to the image captured by the camera so as to re-orientate the image and then to perform image analysis to identify salient features and to generate a crop boundary around those features in accordance with predetermined rules of image composition.

The present invention will now be described, by way of example, with reference to the accompanying drawings in which:

DETAILED DESCRIPTION

Figure 2:
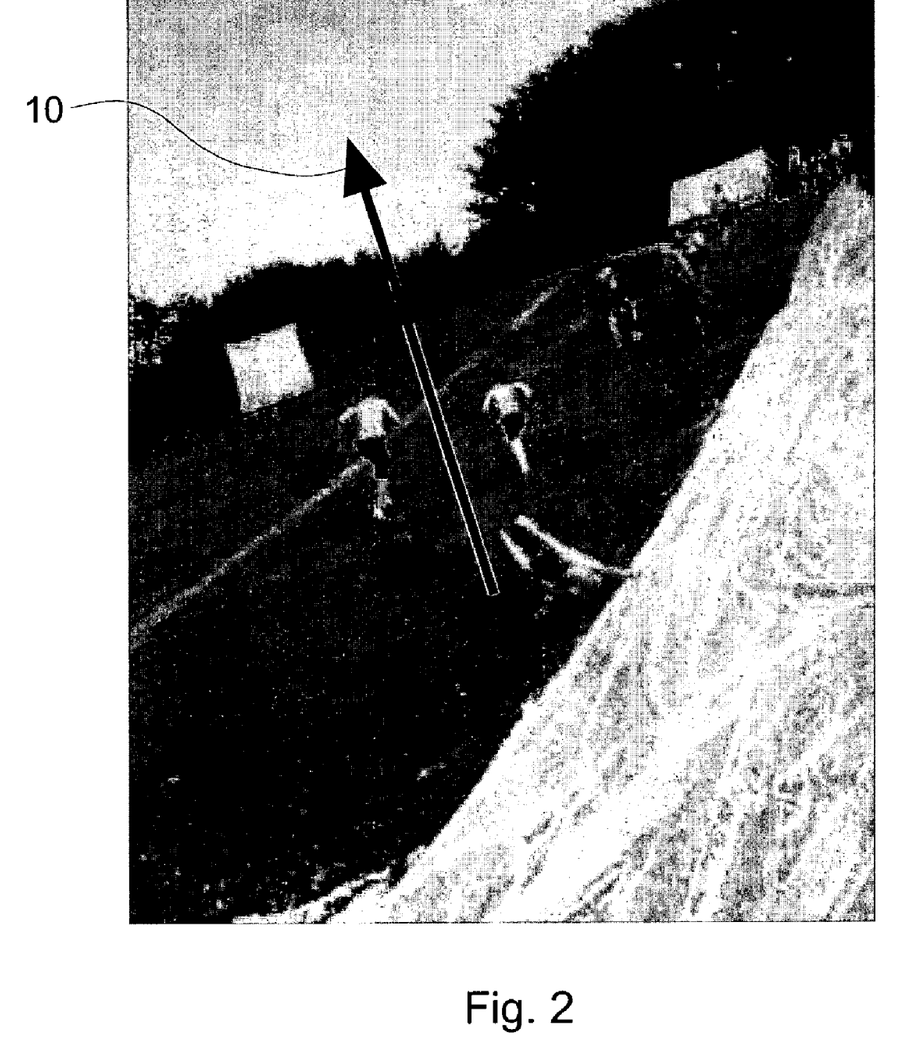
FIG. 2 shows an original tilted image requiring tilt correction.

FIG. 2 shows an image captured whilst the camera has been held at an angle. Reasons for the camera being held at an angle may include the picture being taken in a hurry or the photographer being inexperienced in taking pictures, or inexperienced with the particular camera used. A further reason why the image may be at an angle is that the camera used to capture the image may not have had a view finder allowing the user to check the orientation of the picture. An example of such a camera without a view finder would be a camera integrated within a laptop computer. The image shown in FIG. 2 has an arrow 10 marked on it that indicates the true vertical orientation of the image.

Figure 3:
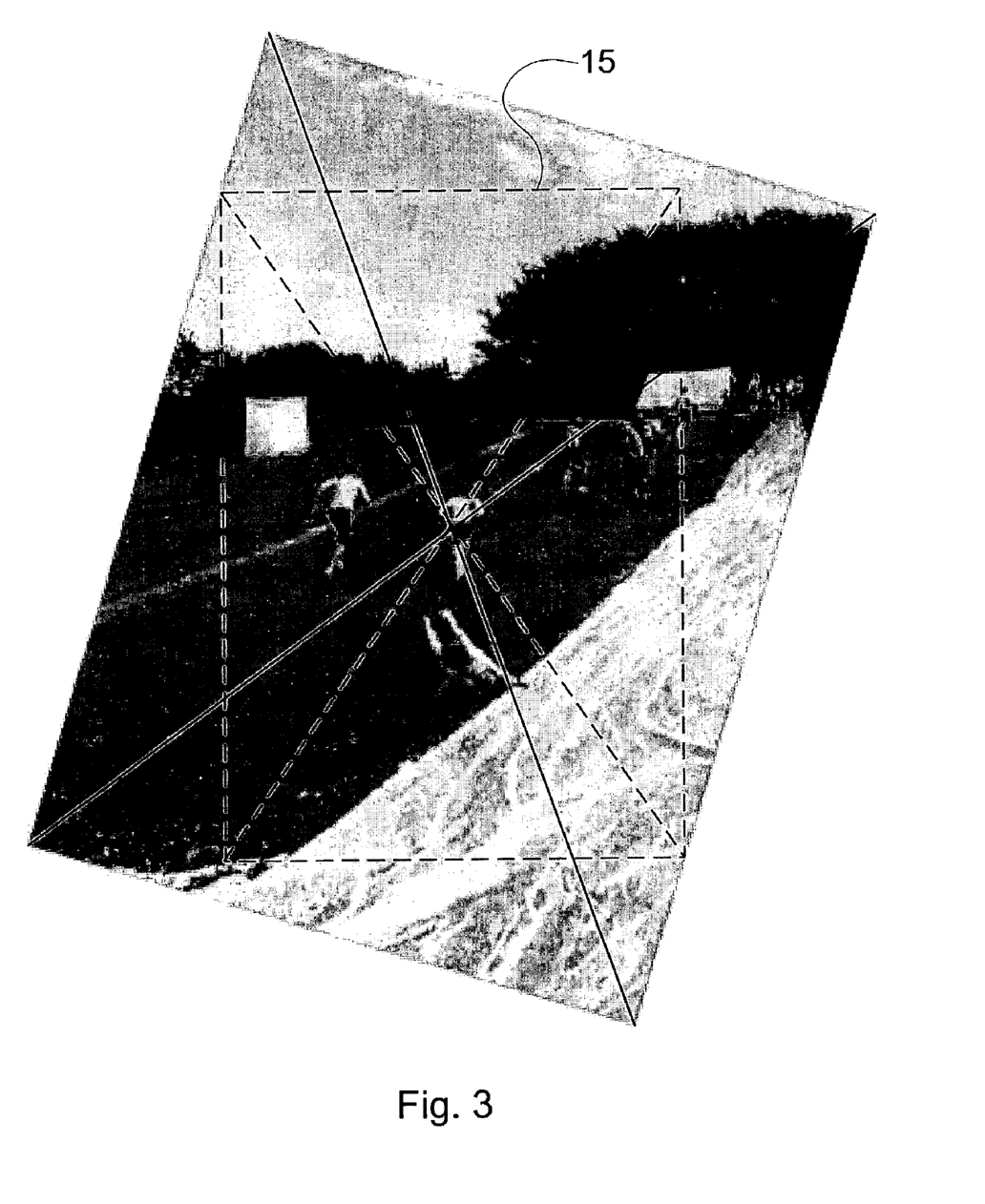
FIG. 3 shows the image of FIG. 2 rotated to correct the tilt and illustrating the position of a cropped image in accordance with the prior art method of FIGS. 1a-1d.
Figure 4:
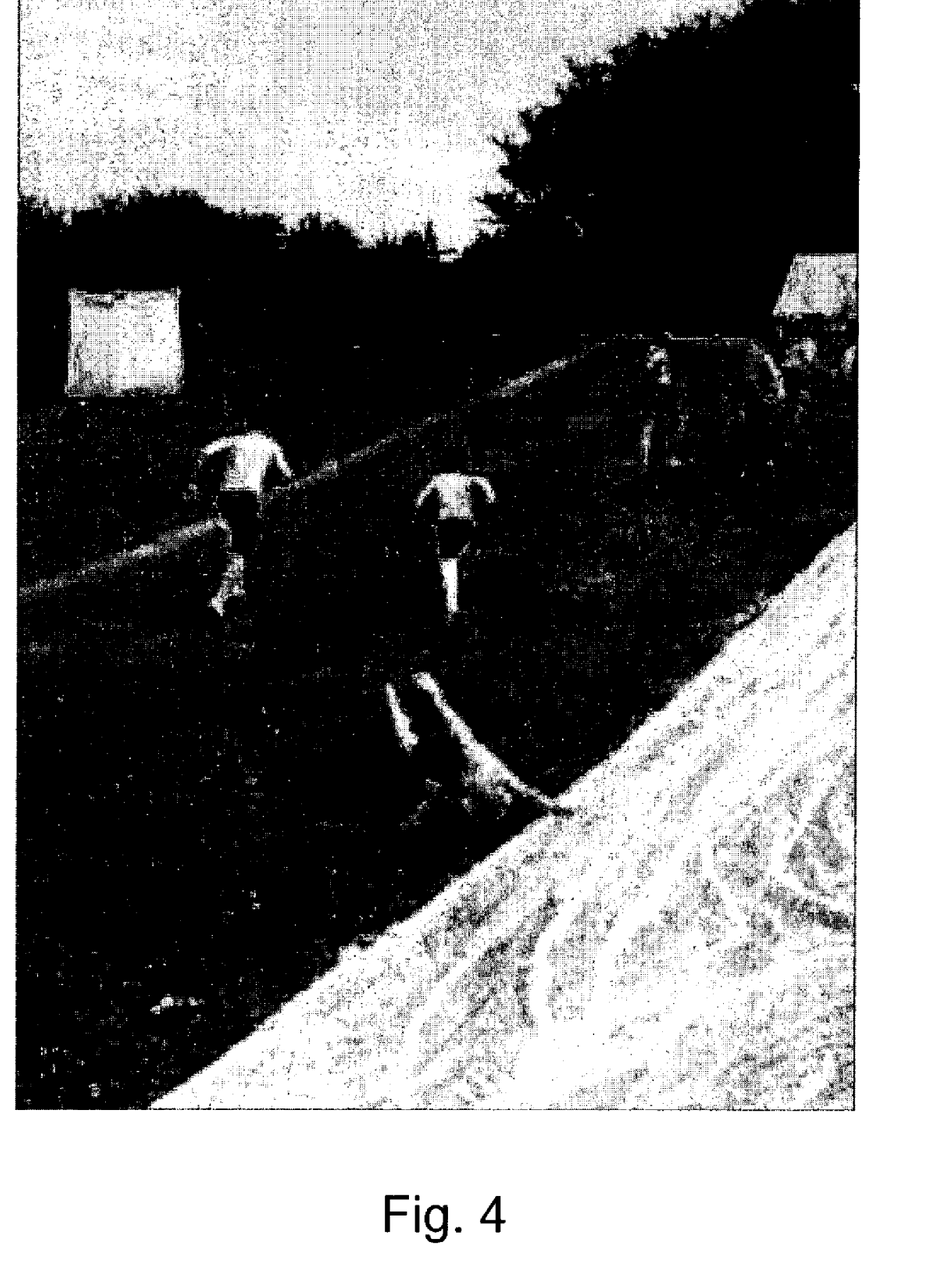
FIG. 4 shows the resulting cropped image of FIG. 3.

FIG. 3 shows the image of FIG. 2 rotated such that the image is now correctly orientated. The solid diagonal lines marked on the image define the centre point of the original image and the dotted cropped boundary 15 represents the maximum rectangular crop boundary having its centre coincident with the centre of the original image. The resulting cropped image is shown in FIG. 4. This method of selecting the crop boundary to correct the tilt of an original tilted image is known from the prior art.

According to embodiments of the present invention the crop boundary is generated in accordance with known compositional rules, taking into account the subject matter of the original image. Such compositional rules are well known to professional and experienced amateur photographers and include the "rule of thirds" whereby the image is bisected into a grid of two equally spaced horizontal lines and two equally spaced vertical lines (in the manner of a "noughts and crosses" board) and elements of interest are placed either on the intersections of these lines or substantially along the lines. For example, the horizon of an image will be placed either on the upper or lower horizontal line. The arrangement of elements of interest according to the "rules of thirds" produces a compositionally pleasing image. Other rules of composition that may be applied include avoiding placing an element of interest at the very edge of the image, or even allowing the edge of an image to bisect an element of interest. A further rule of composition may be to avoid large expanses of either foreground or background having very little interest. Such rules are not "hard and fast" but are in fact heuristic in nature.

For the avoidance of doubt, simply selecting the largest crop boundary that will fit within the rotated image, as known from the prior art, is not considered to be a compositional rule as it takes no account of the subject matter, or composition of the image.

In the method of the present invention it is therefore necessary to identify elements of interest within the original image.

Various schemes are known for selecting an area of compositional significance and/or interest from an electronically captured image. One such known scheme is described in the present applications co-pending UK patent application number 0031423.7 entitled "automatic cropping of electronic images" and a PCT application based thereon. A summary of the scheme disclosed in GB 0031423.7 will now be described for the sake of completeness.

Figure 5:
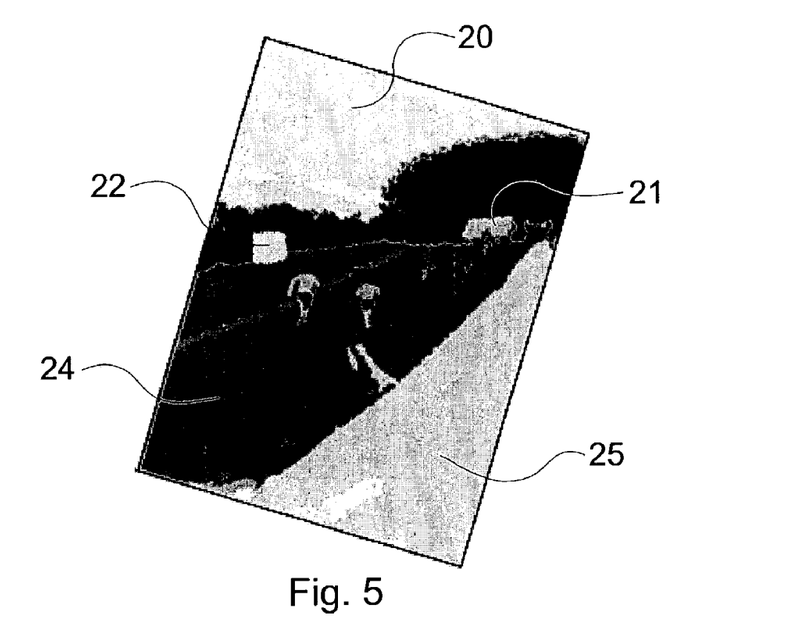
FIG. 5 shows the rotated image of FIG. 3 with regions of similar colour and intensity merged together.

With reference to the original image shown in FIG. 3, the image is first processed in such a way that areas of similar colour, intensity and texture are merged into areas having a uniform colour and intensity. This can be seen with reference to FIG. 5. The main parts of the sky 20 have been merged to areas of uniform colour, as have the two tents 21 and 22. Large areas of the background have also been merged into areas of uniform colour, for example the grass area 24 and the diagonal areas 25 on the right hand side of the image. The techniques for merging the areas of similar colour are well known. For example, the image may be converted into a format having a compressed colour variation and then adjacent areas of similar colour or intensity may then be merged. Similarly, small areas surrounded by larger areas of similar colour or intensity may also be merged into the larger area.

The resultant image is then further processed by comparing adjacent parts of the image with each other and assigning an "interest rating" to each part of the image indicative of the difference between adjacent parts of the image. Using the "interest ratings" a final image, referred to as the saliency image, is generated in which the brightness of an area of the image is proportional to the difference in averaged colour and intensity of adjacent areas. Alternatively, saliency may be judged by comparing how much a coloured region differs from those regions which form the background in the image.

Figure 6:
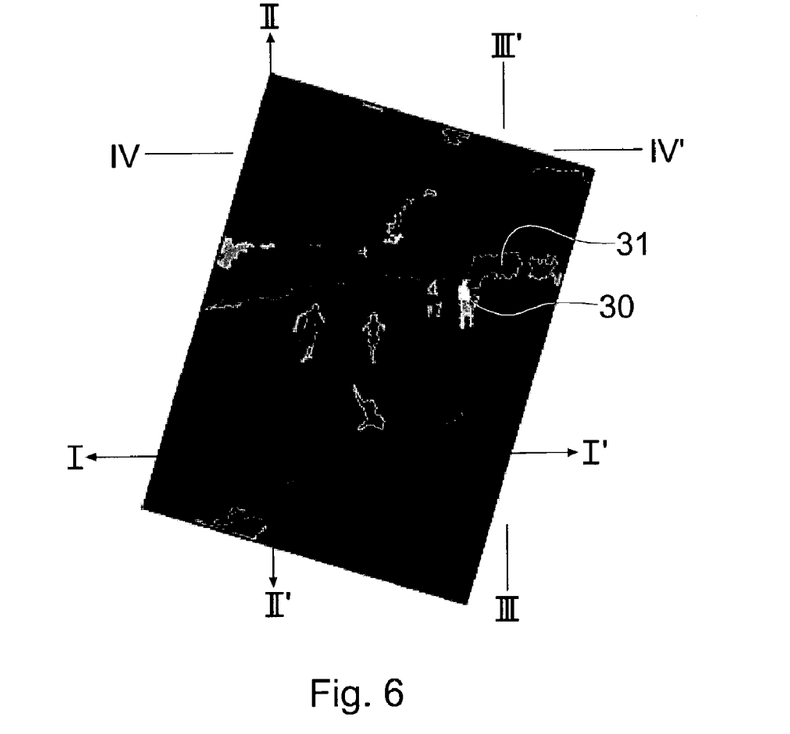
FIG. 6 shows the saliency image of the merged image of FIG. 5.

The saliency image for the image picture of FIG. 3 is shown in FIG. 6. The image analysis may also look for important shapes, such as faces.

Figure 7:
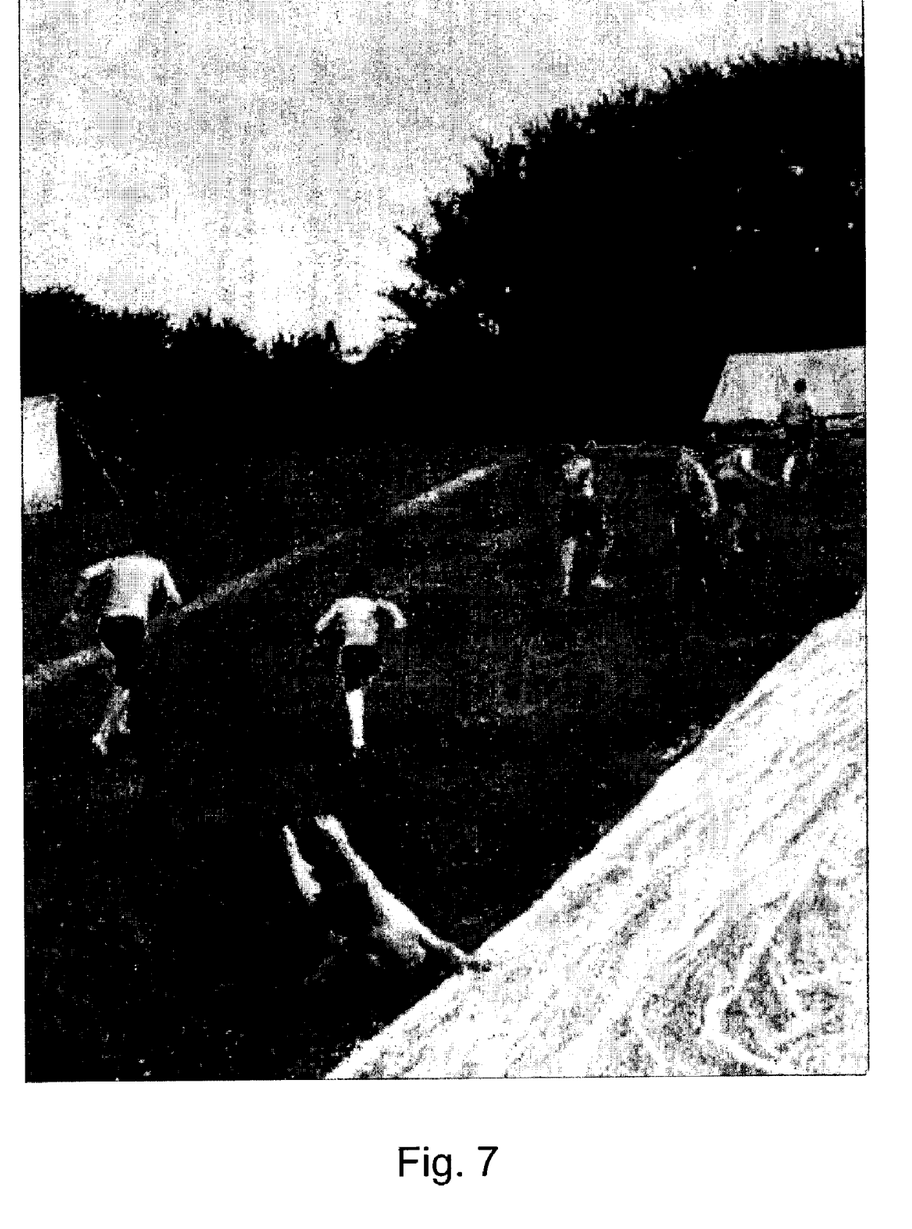
FIG. 7 shows a cropped image of FIG. 2 according to the method of the present invention.

Areas having a high interest rating are shown as the brightest areas. Hence it can be seen from FIG. 6 that the main elements of interest are the running figures, and in particularly the figure marked 30, together with the tent 31 on the right hand side of image. It can also be seen that large areas of the foreground and background are judged to be of little interest. By applying heuristic rules to the saliency image shown in FIG. 6 in accordance with known photographic compositional rules, suitable crop boundaries can be defined. For example, in FIG. 6 a lower crop boundary represented by the line I-I' can be defined below which no areas of interest are located. Similarly, a left hand side crop boundary represented by the line II-II' can also be defined with few or no areas of interest lying to the left of this line. By defining a further two crop boundaries, III-III' and IV-IV', a rectangular crop boundary is defined and applied to the original rotated image. The resulting image, which is produced automatically, is shown in FIG. 7, and has a more pleasing composition than that produced by the prior art shown in FIG. 4.

By varying the rules of composition, and the weighting applied to elements of interest, the crop boundaries produced may be varied. For example, it would be possible to bias areas of interest towards those containing colours and/or intensities relating to skin tones, such that areas of the image including people, or faces, will be more likely to be included in the final crop.

Other compositional rules that may be used include minimising the amount of interest areas that touch the crop rectangle or are very close to an edge of the crop rectangle, ensuring that there are no large areas of background, and avoiding placing a dominant horizontal line near the centre or near the edge of the crop rectangles.

Figure 8:
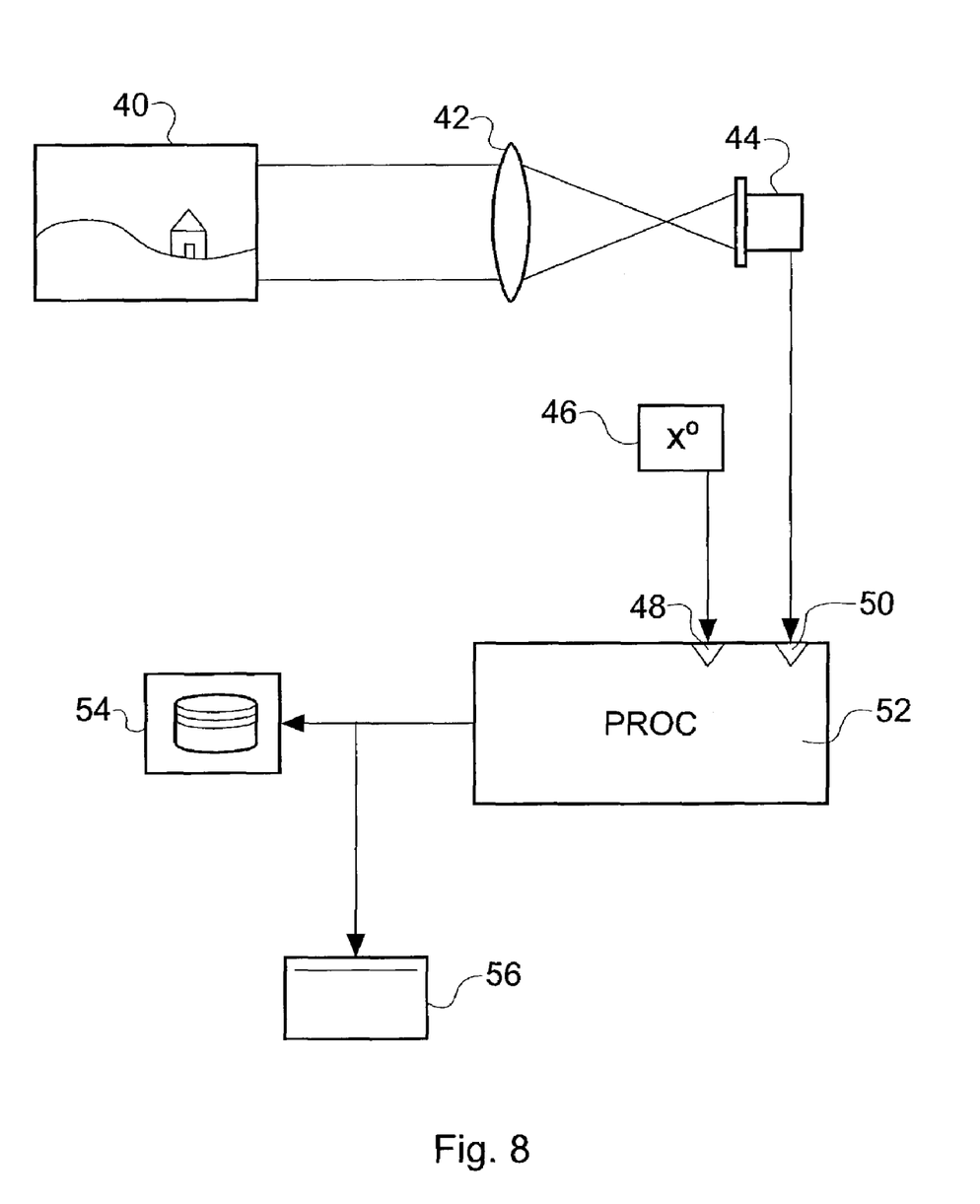
FIG. 8 shows an image capture system and image processing system constituting an embodiment of the present invention.

FIG. 8 schematically illustrates an image processing system and image capture system that operate according to the present invention. An image 40 is captured using an optical lens system 42 that focuses the optical image onto an image array 44. The image array 44 produces an electronic signal representative of the image. The electronic signal is provided to an image input 50 of an image processor 52. A tilt sensor 46 is also included in the camera system to provide indication of the angle at which the camera is held and provides a signal indicative of the rotation of the camera to an angle input 48 of the image processor 52. The image processor 52 is arranged to generate one or more crop boundaries according to the above described method of the present invention to correct the tilt of the original image. The corrected output may either be stored on an image recording means 54, such as a hard disk, ram card or other storage means, or may alternatively or additionally be displayed on a display means 56. The display means 56 may for example be the view finder of the camera system or alternatively may be a display screen of an image viewing system.

The image processor may be allowed to freely identify the areas of interest within the image. However, in an alternative processing mode it may be responsive to user intervention. Thus, the user may use cursor keys or some other pointing device to identify an object that is to be included in the image. The image processor may then analyse the image to identify the boundaries and/or spatial extent of the object. As a further alternative an assumption can be made that the user probably framed the image such that an object that is to be included is in the vicinity of the centre of the image. The image processor may then weight objects near the centre of the image such that they are deemed to be of increased significance. Thus, in effect, a camera can be used as a pointer.

As a further option, the image processor may be preferentially responsive to tags or markers placed on subjects to be included in the final cropped image. Such tags or markers may be invisible to the human eye, but may reflect in the infra-red or UV wavelengths such that they can be identified by a suitably enabled camera.

It will be appreciated that the tilt sensor may be dispensed with and the "vertical" or "horizontal" directions may be determined from image analysis or by user input. The system need not be restricted to cameras, but may also apply to image scanners and other devices which are used to capture electronic images.

Figure 9:
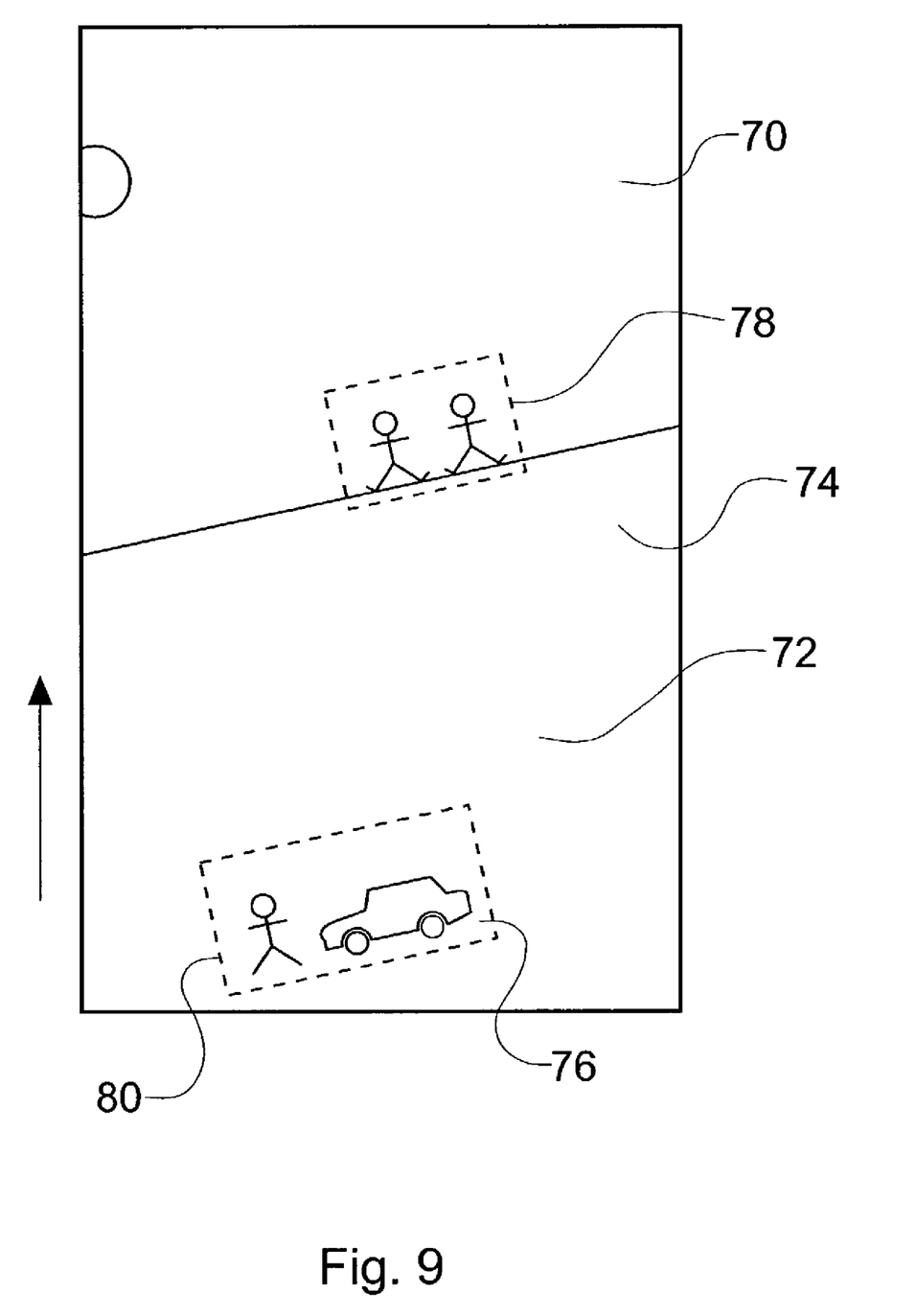
FIG. 9 shows how the cropped image may change between landscape and portrait formats.

FIG. 9 schematically illustrates how the method of the present invention may be used to change the orientation of the crop boundary from that of the original image. The image shown in FIG. 9 is tilted away from a nominally portrait orientation. In broad terms, the image comprises an area of sky 70 and a large area of land 72. Two figures spaced closely together occur in a region 74 of the image whereas a further figure adjacent a motor vehicle occurs in the region 76 of the image. It is only the regions 74 and 76 which constitute compositionally significant areas of the image. The bulk of the regions 70 and 72 form areas of background which are identified in the saliency analysis.

The region 74 is positioned towards the centre of the image and hence it can be cropped in either a portrait format, or a landscape format, as shown and delineated by the chain line 78. However, the region 76 is positioned towards a corner of the image and it would be difficult to make a sensible cropping of this region 76 using a portrait format crop. However, a landscape format crop as delineated by chain line 80 simultaneously allows the cropped region to conform to the general shape of the area of interest therein, and also allows the crop boundary to approach the edge of the image. Thus there are advantages in allowing the cropping algorithm to switch between landscape and portrait formats, and in particular to chose a format which differs to that of the original image. As shown, areas 76 and 78 are also cropped with different aspect ratios.

It is thus possible to provide a method of and apparatus for automatic analysis of an image to define suitable crop boundaries.

The invention claimed is:

1. A method of correcting tilt of an electronic image, the method comprising:
   rotating an original, tilted image by a correcting angle of rotation;
   analyzing different image features within the original image to determine a subject matter of the original image; and
   automatically cropping the resulting rotated image in accordance with at least one rule selected from a predefined set of image composition rules, wherein the rule is based on the subject matter of the original image, such that the crop boundary is contained within the original image.

2. A method of correcting tilt of an electronic image according to claim 1, wherein said image composition rules comprise:
   identifying one or more elements of interest within said image;
   selecting one or more of said identified elements to be included within the cropped image; and
   generating at least one crop boundary so as to include said selected elements of interest.

3. A method of correcting tilt of an electronic image as claimed in claim 2, wherein the crop boundaries are calculated such that the area defined by the boundaries is determined on the basis of the image features in the original image.

4. A method as claimed in claim 1, wherein the crop boundary is rectangular and has one axis in a notionally vertical direction.

5. A method of correcting tilt of an electronic image according to claim 1, wherein said electronic image has a predefined aspect ratio and said rotated image is cropped such that the cropped image has said predefined aspect ratio.

6. A method of correcting tilt of an electronic image according to claim 1, wherein said crop boundary is smaller than the largest crop boundary that can be fitted within said original tilted image.

7. A method of correcting tilt of an electronic image according to claim 1, wherein said correcting angle of rotation is determined at the time of capturing said original image.

8. A method of correcting tilt of an electronic image according to claim 1, wherein said correcting angle of rotation is defined by a manual input.

9. A method of correcting tilt of an electronic image according to claim 1, wherein said correcting angle of rotation is determined by analysis of said image.

10. A method of correcting tilt of an electronic image according to claim 9, wherein said analysis comprises identifying one or more features of said original image having one of a known or predicted orientation and determining the angle of rotation of said identified feature with respect to said known or predicted orientation.

11. A method of correcting tilt, as claimed in claim 1 wherein the crop boundary can be in one of portrait and landscape format irrespective of the notional configuration of the original image.

12. A method as claimed in claim 1, wherein the cropped image is rectangular, with an aspect ratio automatically selected by an image processor based on image content.

13. A method of correcting tilt, wherein the method comprises:
   a) receiving an electronic image;
   b) rotating the image to correct for tilt;
   c) automatically analyzing different image features within the image in accordance with at least one compositional rule, wherein the rule is applied based on subject matter of the original image, in order to identify compositionally significant features within the image and to generate at least one crop of the image; and
   d) outputting the at least one cropped image;
   wherein the cropped image is not merely concentric with the original electronic image.

14. A method as claimed in claim 13, wherein the image is analyzed to identify the colors within the image and regions having a color which occupies a relatively small portion of the image are determined to be salient.

15. A method as claimed in claim 13, wherein one of the compositional rules includes ensuring that objects occurring in a central region of the image are included in the at least one cropped image.

16. A method as claimed in claim 13, wherein one of the compositional rules includes performing a search for faces and including them within the crop.

17. A method as claimed in claim 13, wherein the tilt of the image is determined by a tilt sensor at the time of image capture.

18. A method as claimed in claim 13, wherein the tilt of the image is determined by analysis of features contained within the image.

19. An image processing system for correcting tilt of an electronic image, comprising:
- an image input arranged to receive an original rotated image;
- an angle of rotation input arranged to receive a signal indicative of an angle of rotation associated with said original image;
- an analyzer configured to analyze different image features within the original image to determine a subject matter of the original image; and
- an image processor connected to said analyzer, said image input and said angle of rotation input and arranged to rotate said original image to correct for said rotation and to crop the resulting rotated image in accordance with a predefined set of image composition rules, wherein the rules are based on the subject matter of the original image as determined by said analyzer, such that the crop boundary is contained within the original image.

20. An image processing system as claimed in claim 19, wherein the image composition rules comprise:
- identifying at least one region of interest within the image;
- selecting at least one of the identified regions to be included within the cropped image; and
- generating at least one crop boundary to include at least one of the identified regions.

21. An image processing system as claimed in claim 19, wherein the at least one cropped image is not concentric with the original rotated image.

22. An image processing system as claimed in claim 19, wherein the at least one crop boundary is smaller than the largest tilt corrected crop that can be contained within the original rotated image.

23. An image processing system as claimed in claim 19, wherein the system includes a sensor for detecting the orientation of an image capture array.

24. A camera including an image processing system as claimed in claim 19.

* * * * *